United States Patent [19]
Kakita et al.

[11] Patent Number: 5,162,832
[45] Date of Patent: Nov. 10, 1992

[54] AUTOMATIC RELEASE CAMERA

[75] Inventors: Tsuyoshi Kakita; Yasushi Hishino, both of Topkyo, Japan

[73] Assignee: Konica Corporation, Tokyo, Japan

[21] Appl. No.: 732,431

[22] Filed: Jul. 18, 1991

Related U.S. Application Data

[63] Continuation of Ser. No. 539,336, Jun. 18, 1990, abandoned.

[30] Foreign Application Priority Data

Jun. 20, 1989 [JP] Japan .................................. 1-155900

[51] Int. Cl.$^5$ .............................................. G03B 17/40
[52] U.S. Cl. .................................... 354/266; 381/105; 381/110
[58] Field of Search ................ 354/411, 67, 266, 131, 354/267.1; 381/105, 110

[56] References Cited

U.S. PATENT DOCUMENTS

| | | | |
|---|---|---|---|
| 3,961,342 | 6/1976 | Maida | 354/412 |
| 4,068,092 | 1/1978 | Ikoma et al. | 381/110 |
| 5,014,079 | 5/1991 | Kakita | 354/266 |

FOREIGN PATENT DOCUMENTS 57-131193  8/1982  Japan .................................. 381/105

OTHER PUBLICATIONS

Popular Photography, "It doesn't talk, it listens", vol. 97, No.2, Feb. 1990, p. 21.

Primary Examiner—W. B. Perkey
Assistant Examiner—Cassandra C. Spyrou
Attorney, Agent, or Firm—Finnegan, Henderson, Farabow, Garrett and Dunner

[57] ABSTRACT

A camera for taking a photograph by automatically releasing a shutter, comprising; a detector for detecting a sound pressure level, and a pre-programed CPU for determining a first period of time that the detected sound pressure level exceeds a predetermined sound pressure level in which the camera releases the shutter when the first period of time exceeds a second period of time, and the CPU varies the second period of time according to an increase rate of the sound pressure.

6 Claims, 8 Drawing Sheets

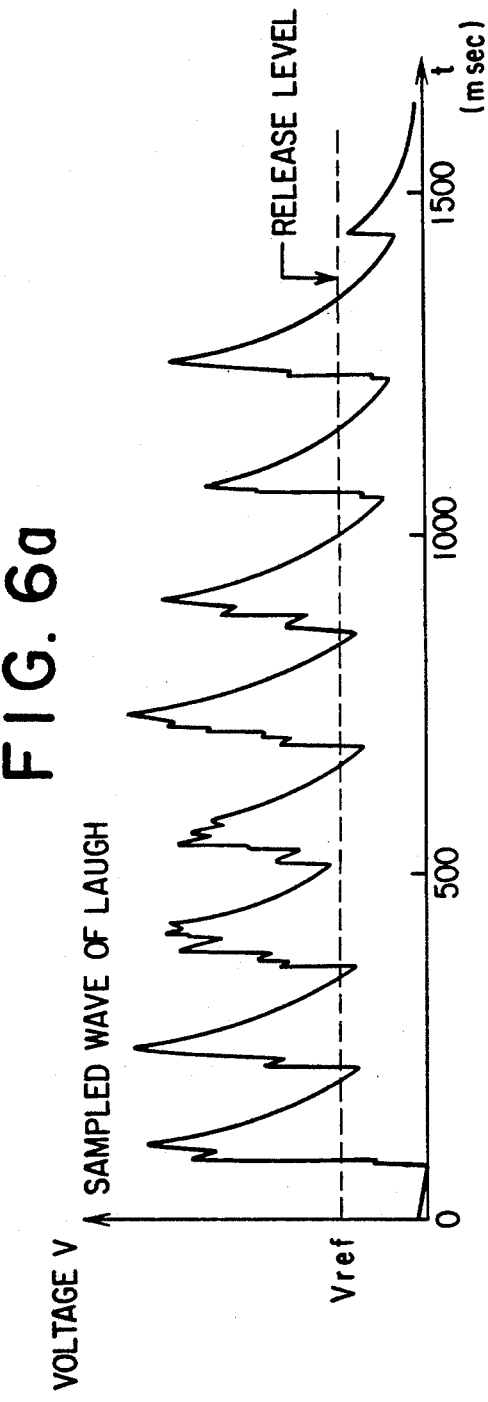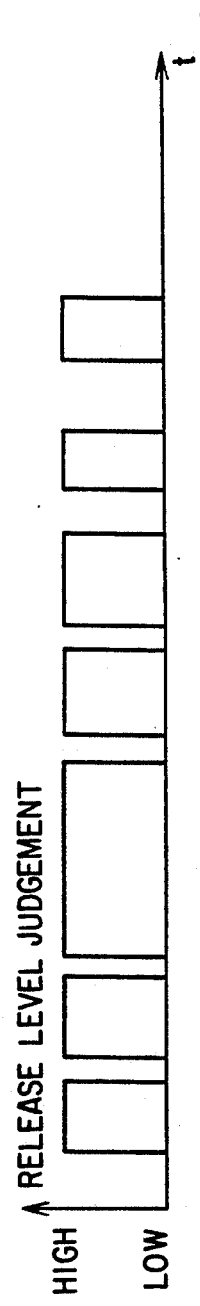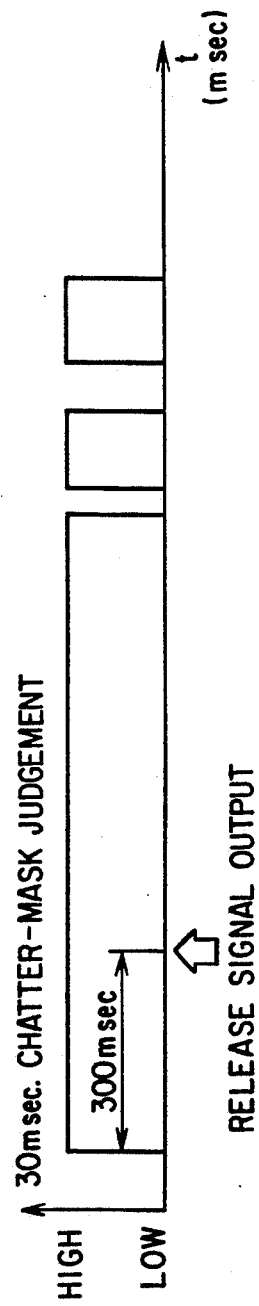

AUTOMATIC RELEASE CAMERA

This application is a continuation of application Ser. No. 07/539,336 filed Jun. 18, 1990.

BACKGROUND OF THE INVENTION

The present invention relates to an automatic release camera wherein a shutter is released based on the sound pressure level of an inputted voice.

There are many chances for photographing in a banquet or a party, and it is rather troublesome for a photographer to walk to and fro for photographing in the midst of a dinner party, and in addition to that, the photographer himself does not have any chance to be photographed. In this connection, if there is available a camera that senses a shutter chance and releases a shutter automatically, such a camera is very convenient and it can make all persons present at a banquet or a party including the photographer enjoy an atmosphere.

When considering the situation in which such a camera is used, the best photograph may be obtained if a shutter of the camera is released at the climax of the banquet or the party. Therefore, one way to be considered is to make the camera catch a laughing voice, a shout of joy, a handclap or cheers in the climax of the banquet, for example, and release a shutter. In case of a conventional voice-recognition camera, however, it senses only a specific voice. Therefore, it can not release a shutter by catching such a voice in the climax as mentioned above.

The inventors of the invention, therefore, proposed an automatic release camera in Japanese Patent Application No. 329184/1988 wherein a shutter is released when the voice pressure level of an inputted voice is detected and the detected voice pressure level keeps to be higher than a reference value for a predetermined period. According to the camera, it is possible to make the camera release a shutter automatically responding to the laughing voice in a banquet or a party without responding to a crashing sound. Thus it is possible to get the best photograph, since the shutter is released in the climax of a party or at the moment of enjoyment.

In the aforesaid camera, however, the occasion when a voice pressure level higher than a reference value lasts for a predetermined period it is not only the case of a laughing voice, a shout of joy and a handclap in the climax of a banquet but also the case when people give a shout of 'Get me a bottle of beer!', 'Get me an ashtray!' or 'Hey!' in the banquet. Therefore, the camera mentioned above has a problem that a shutter may also be released on the occasion other than the case when the banquet reaches its climax or the pleasure arrives at its utmost.

SUMMARY OF THE INVENTION

It was noticed in the invention, when a laughing voice and a shout of joy in a banquet or a party were studied, that the voice pressure level of a voice produced in such occasion rises gradually, while the voice pressure level of a shout of 'Get me a bottle of beer' or 'Get me an ashtray' rises sharply.

Taking the rising rate of the voice pressure level into consideration, the invention whose object is to provide a camera capable of releasing a shutter automatically responding to the optimum shutter chance when a banquet arrives at its climax without responding to a crashing sound or a shout, is arranged, for the purpose of achieving its object, so that the length of the minimum period for the voice pressure level higher than a reference value that is a standard for shutter releasing can be changed according to the rise rate of the voice pressure level.

DETAILED DESCRIPTION OF THE INVENTION

Figure 1:
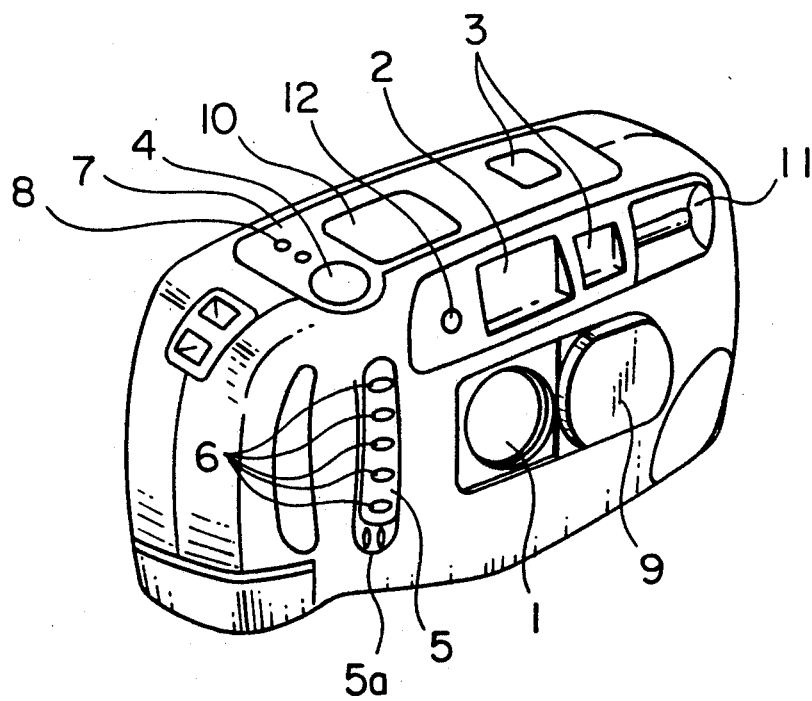
FIG. 1 is a perspective view of an example of an automatic release camera related to the invention.

The invention will be explained as follows, referring to the drawings.

FIG. 1 is a perspective view of an example of an automatic release camera related to the invention in which a fixed focus camera of an automatic film-advancing type is exemplified. It is natural that the invention is not limited to the camera of such a type but can also be applied to an AF (automatic focusing)camera and others.

In the figure, 1 represents a camera lens, 2 is a rangefinder, 3 is a framing monitor, 4 is a shutter-release button, and 5 is an automatic release lever.

When automatic release lever 5 is slid upward, microphone aperture 5a appears. Inside microphone aperture 5a, there is provided a microphone (same as microphone 34 in FIG. 2) for detecting the voice pressure. Automatic release lever 5 is provided with 5 LEDs 6 for indicating the voice pressure level of a voice inputted from the microphone. Namely, automatic release lever 5 plays a role of an operating member as well as a role of a display member, thus making it clear and easy for a user to change a mode, because the user can control ON/OFF of the automatic release mode by operating the lever on which the voice pressure level is indicated. In addition to that, it is possible to release a shutter by pressing release button 4 as an ordinary way.

The numeral 7 is a mode-changing button with which the selection of whether to use a self-timer, a flash light or not can be made in an ordinary photographing mode.

The numeral 8 is a rank-setting button with which a rank of how easily a shutter is released is set according to the state of a voice pressure level in an automatic release mode. For the purpose of easy usage thereof in this particular example, only three ranks of 'easy releasing', 'normal releasing' and 'hard releasing' are used, without having many ranks to be set. Each time rank-setting button 8 is pressed, the minimum time period for which the voice pressure level is to last, which is a reference for the start of releasing, is changed. Thus, the rank of how easily the releasing is made is changed in that sequence. The level of how easily the releasing is made, namely, the rank is indicated on a liquid-crystal display panel which will be stated later.

The numeral 9 is a lens barrier for protecting a camera lens, 10 is a liquid crystal panel on which the number of exposed film frames, a set value of a reference voice pressure level and other photographing-related information are displayed, 11 is a flash light, and 12 is a photoreceptor lens for photometry.

Figure 2:
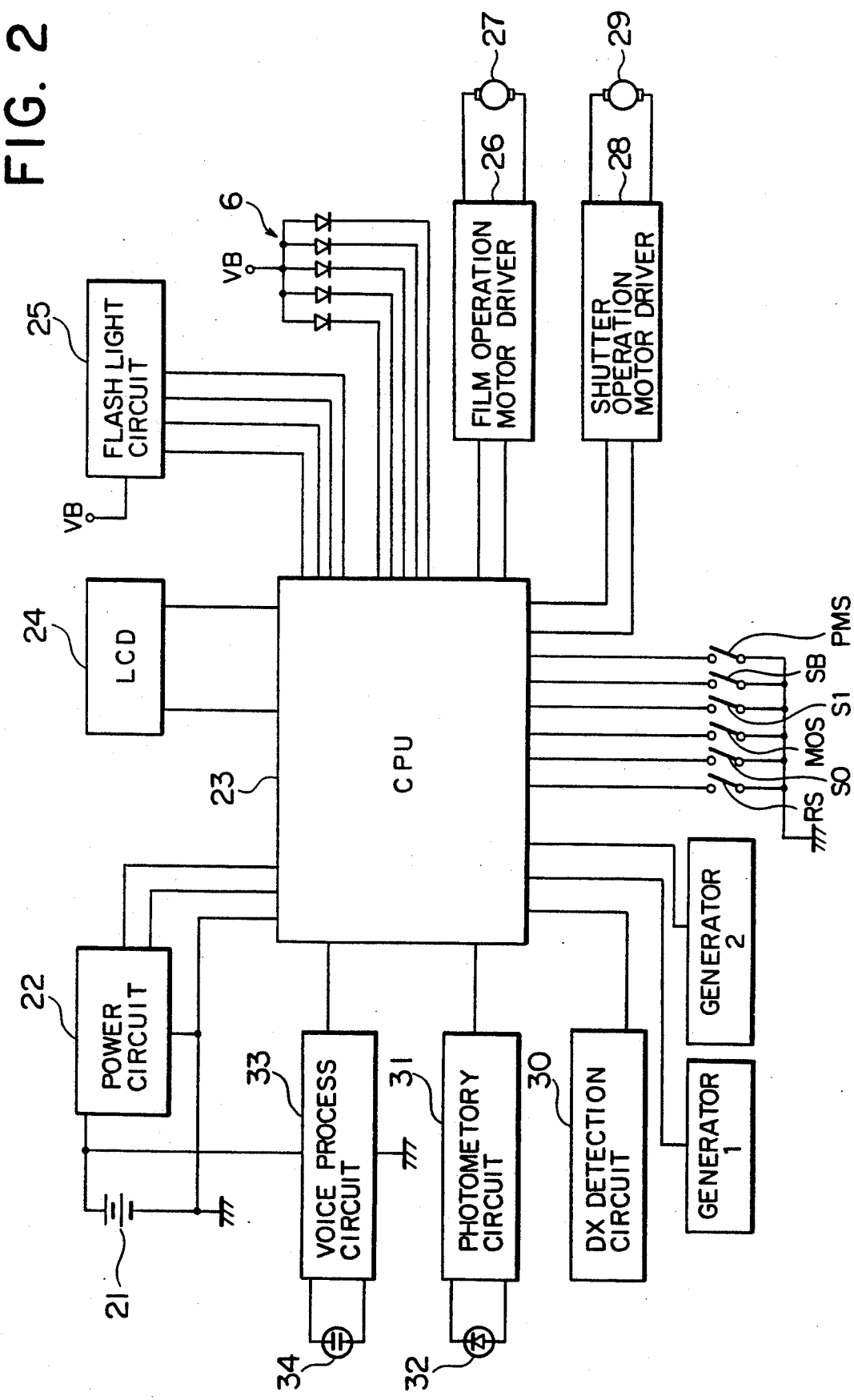
FIG. 2 is a block diagram showing a circuit structure of the example in FIG. 1, FIG. 3 and FIG. 4 are a block diagram and a circuit diagram respectively of a voice process circuit in FIG. 2, each of FIGS. 5a, 5b, 5c, 6a, 6b, and 6c is an illustration showing the principle of automatic releasing.

FIG. 2 is a block diagram showing a circuit arrangement of the camera in FIG. 1.

In the figure, 21 is a battery, 22 is a power circuit supplying power to each circuit, and 23 is CPU having therein an A/D converter of a built-in type which controls photographing sequence. CPU 23 also functions as a release-judging means that determines whether to release or not to release, judging a voice pressure level of a voice inputted from microphone 34. The numeral 24 represents LCD and its driving circuit for liquid crystal display panel 10, 25 is a flash light circuit for flashing flash light 11, 26 is a film operation motor driver that drives film operation motor 27, and 28 is a shutter operation motor driver that drives shutter operation motor 29.

With regard to switches, PMS is a switch for setting an automatic release mode with automatic release lever 5 slid upward to cause ON, SB is a switch that is turned on when a camera back is opened, S1 is a switch that is turned on when shutter-release button 4 is pressed, MOS is a switch that is turned on when mode-changing button 7 is pressed, SO is a switch that is turned on when lens barrier 9 is opened, and RS is a switch that is turned on when rank-setting button 8 is pressed.

The numeral 30 is a DX-detecting circuit that detects the ISO speed based on the DX code printed on a film cartridge, 31 is a photometry circuit that receives an output from photoreceptor element 32 and thereby measures a subject brightness, and 33 is a voice process circuit that processes input signals from microphone 34.

Figure 3:
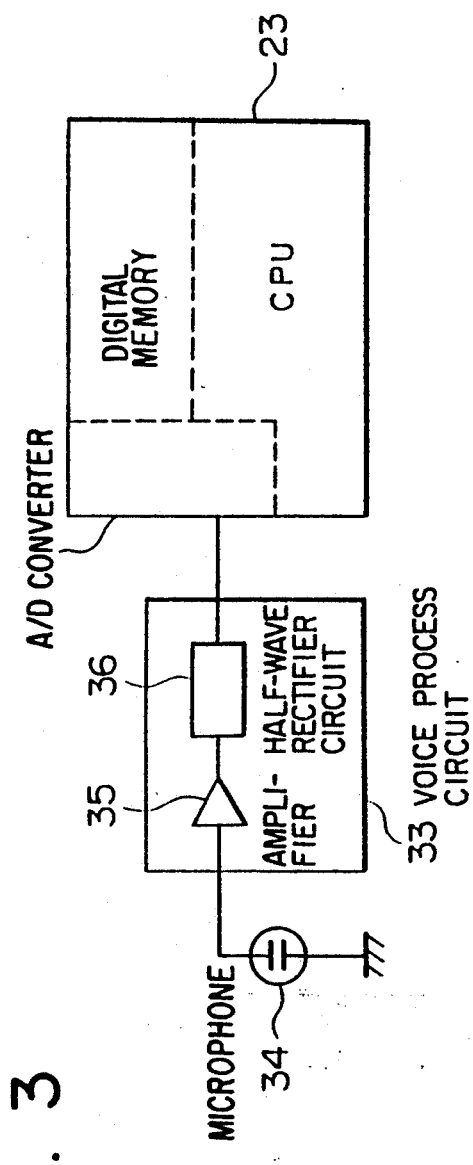

Voice process circuit 33 is composed, as shown in FIG. 3, of amplifier 35 that amplifies output signals from microphone 34 and of half-wave rectifier circuit 36 that converts the aforesaid amplified signals to voice pressure signals which represent only the loudness of the voice. Voice pressure signals are sent to an A/D converter in CPU.

Figure 4:
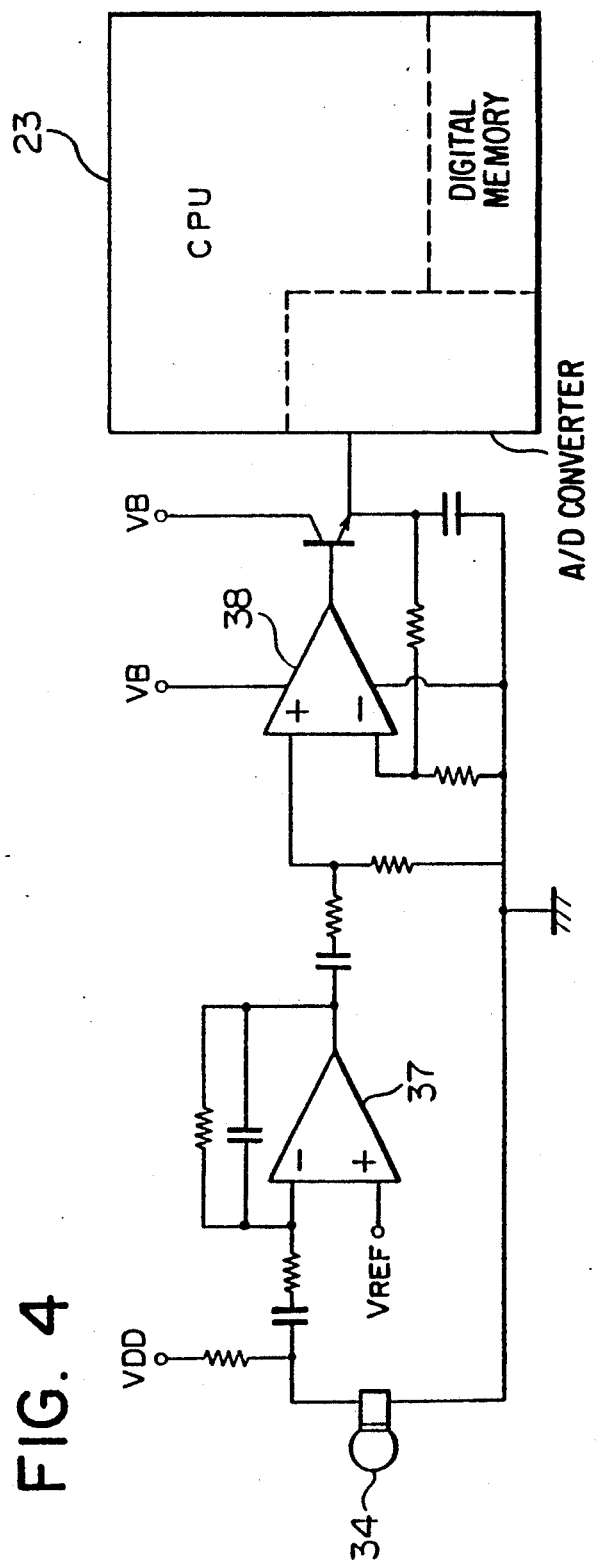

FIG. 4 is a more particular circuit diagram of voice process circuit 33 wherein signals from microphone 34 are amplified by operation amplifier 37 at the first step and then are converted to voice pressure signals through operation amplifier 38 in the next step.

In the conventional voice-recognition camera, a specific voice is analized in terms of its frequency and registered in the camera in advance, and then the voice inputted in the camera is divided into components according to each frequency component, and each component is compared with the registered voice (specific speaker recognition). Thus, the conventional camera is extremely complicated in its structure. The structure of a camera related to the invention, on the other hand, is simple as shown in FIG. 3 due to the method mentioned above.

The principle of judging for shutter-releasing in the invention will be explained as follows.

Figure 5A:
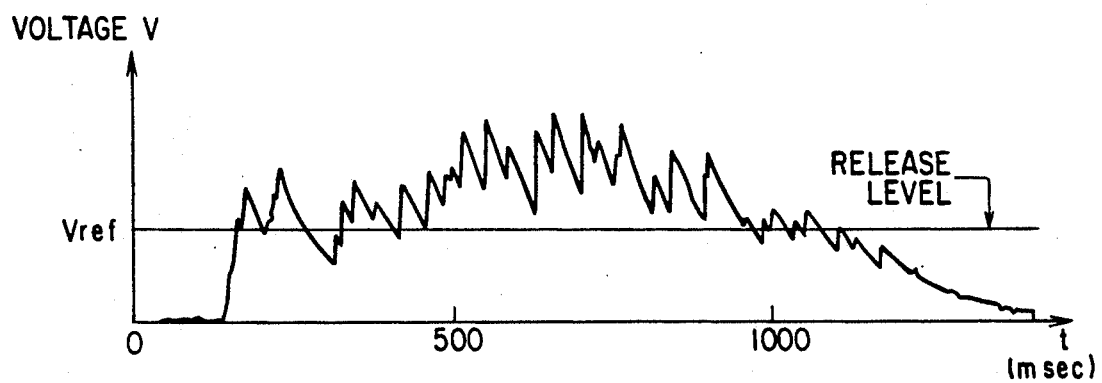

FIG. 5(a) shows an example of output wave-form of voice process circuit 33.

Figure 5B:
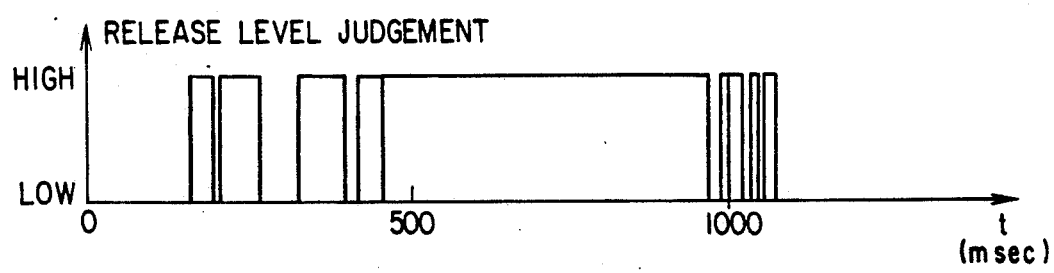
Figure 5C:
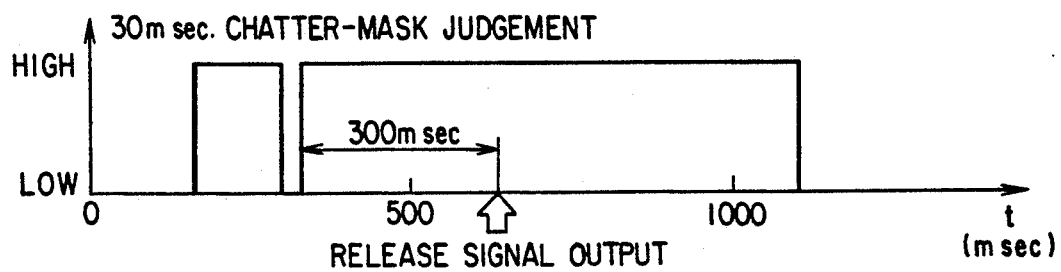

When the reference voice pressure level is set at $V_{ref}$, the judgment is made in CPU 23 whether the inputted voice pressure level is higher (HIGH) than $V_{ref}$ or lower (LOW) than $V_{ref}$ as shown in FIG. 5 (b). Next, even if the inputted level is lower than $V_{ref}$(LOW), when it becomes higher than $V_{ref}$(HIGH) after a short period of time (e.g. 30 msec), this period when the inputted level is lower than $V_{ref}$(LOW) is ignored and regarded as higher (HIGH)(hereafter referred to as 'chatter mask'). The illustration of wave-form shown in FIG. 5 (c) is what was obtained after the aforesaid processing. Finally, if the period when the inputted level is higher than $V_{ref}$(HIGH) lasts for the period longer than the predetermined time (e.g. 300 msec), CPU 23 generates releasing signals for shutter motor driver 28, thus releasing the shutter. The reason why the releasing action is made after the period of 300 msec is for avoiding that the shutter-releasing is actuated by a crashing sound (normally, about 100 msec) such as a sound produced when a beer bottle falls or a door is closed.

The chatter mask is applied so that a camera may respond, for shutter-releasing, even to the laughing voice with which a good photo can be expected in a banquet. According to experiments made by inventors, the waveform of laughing voice of a man is characterized in that the high voice pressure and the low voice pressure are repeated at a very short period of interval as shown in FIG. 6 (a). FIG. 6 (b) shows the results obtained when such a voice pressure waveform is compared with reference voice pressure level $V_{ref}$ and judged to be lower than $V_{ref}$(LOW) or higher than $V_{ref}$(HIGH). However, when a camera is caused to perform the shutter-releasing when the period of HIGH is longer than 300 msec based upon the results shown in FIG. 6 (b), the waveform becomes discontinuous as shown in FIG. 6 (b) depending on the set value of $V_{ref}$, resulting in failure of continuation of 300 msec, thus disabling a camera for shutter-releasing.

Therefore, when the chatter mask explained in FIG. 5 is applied, the period lower than $V_{ref}$(LOW) which becomes higher than $V_{ref}$(HIGH) after a short period of time (e.g. 30 msec) is ignored and such period is processed as if it is higher than $V_{ref}$(HIGH), thus a shutter is released if the period is HIGH for the predetermined period or more. By applying the chatter mask in the aforesaid way, a camera can respond, for shutter-releasing, even to the voice having a special discontinuous voice pressure level like a laughing voice.

In addition to the judgment for releasing mentioned above, the following processing is carried out in the invention for the purpose of catching the optimum shutter chance.

Figure 7A:
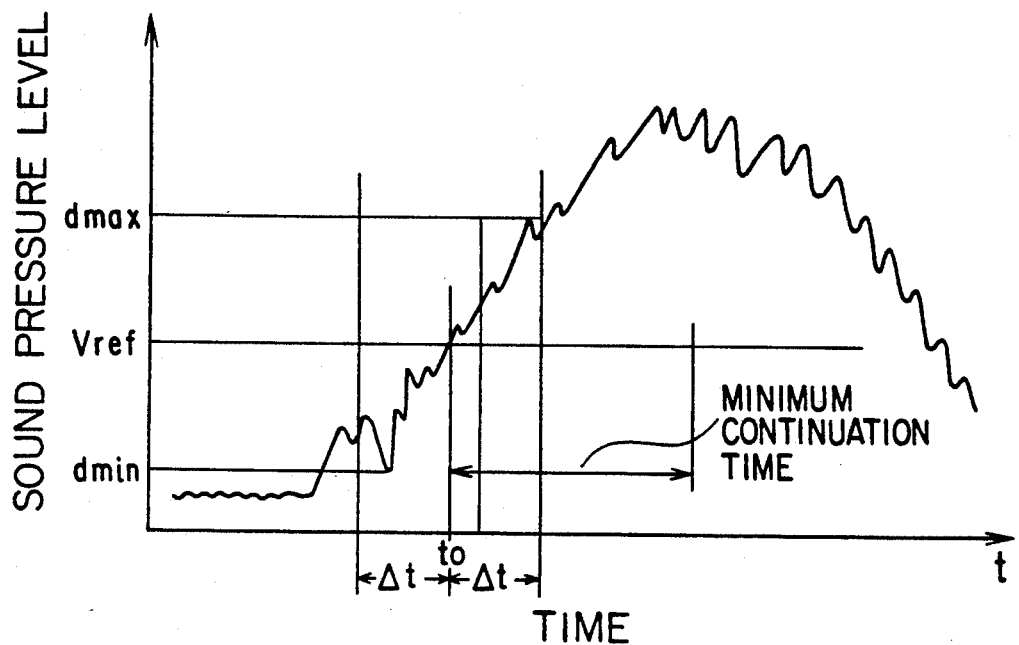
FIG. 7 is an output waveform of a voice process circuit in which (a) is a laughing voice of a man and (b) is a crashing sound.
Figure 7B:
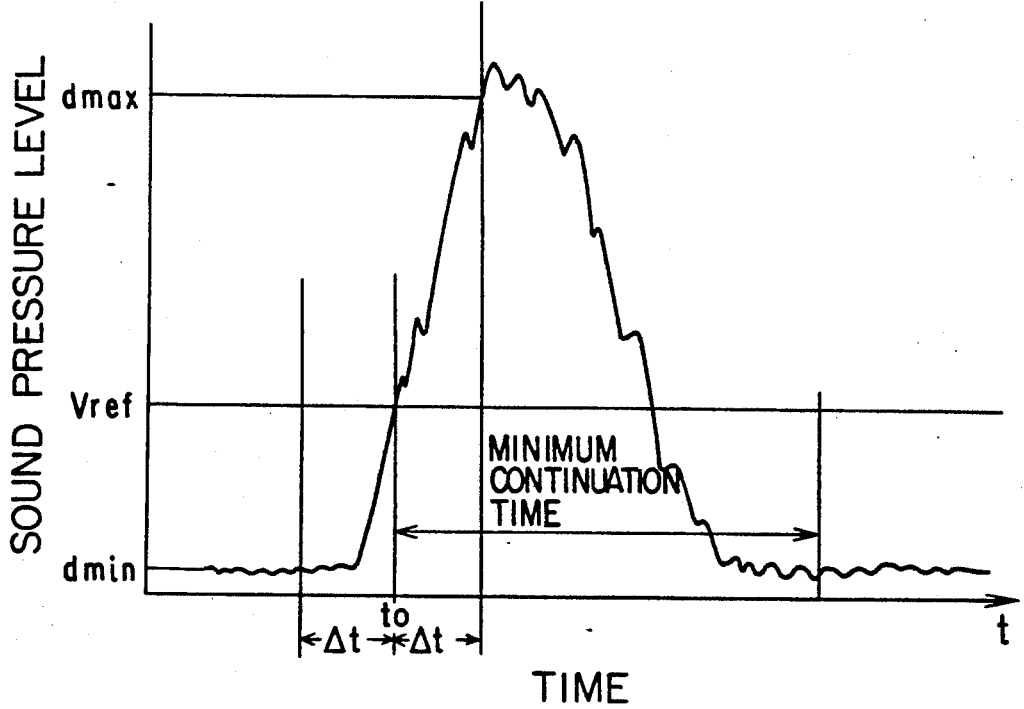

FIG. 7 shows the output waveform of voice process circuit 33, wherein (a) shows a laughing voice of a man, while, (b) shows a crashing sound. As is clear when both are compared, the voice pressure level of the laughing voice tends to rise more gradually than that of the crashing sound does.

The output of voice process circuit 33 is A/D-converted by the A/D converter in CPU 23 and then is stored in a digital memory. In CPU 23 during the period of $\Delta t$, that is the difference between the time before and after the time $t_o$ when the voice pressure level of a voice inputted arrives at reference voice pressure level $V_{ref}$ set in advance, a minimum $d_{min}$ of voice pressure level is selected from plural groups each composed of plural voice pressure level data which are sampled at a predetermined interval in the area before $t_o$, and a maximum value $d_{max}$ is selected in the area after $t_o$, thus the judgment whether the difference $d_{max} - d_{min}$ is greater than prescribed value A or not is made. As a result, in case of $d_{max} - d_{min} \geq A$ as shown in FIG. 7 (b), the minimum continuing period for the voice pressure level needed for shutter-releasing is set, for example, to 500 msec because of the judgment of a crashing sound due to the rise rate of the voice pressure level which is relatively sharp. In case of $d_{max}-d_{min}<A$, on the other hand, the minimum continuing period of the voice level needed for shutter-releasing is set, for example, to 300 msec because of the judgment as a human laughing voice due to the rise rate of the voice pressure level which is relatively gentle.

As is stated above, the rise rate of the voice pressure level of a voice inputted from microphone 34 is judged roughly, and when the rise rate is sharp, the inputted voice is judged not to be a laughing voice but to be a crashing sound and the minimum continuing period of the voice pressure level needed for shutter-releasing is set to be rather long so that the shutter may not be released easily, and when the rise rate is gentle, the inputted voice is judged to be a human laughing voice, and the minimum continuing period of the voice pressure level needed for shutter-releasing is set to be rather short so that the shutter may be released easily. Incidentally, the minimum continuing period is set to different values according to the ranks of releasing of 'easy releasing', 'normal releasing' and 'hard releasing' set by rank-setting button 8.

Next, the actions in the example will be explained as follows, referring to the flow charts in FIG. 8 and FIG. 9.

Figure 8:
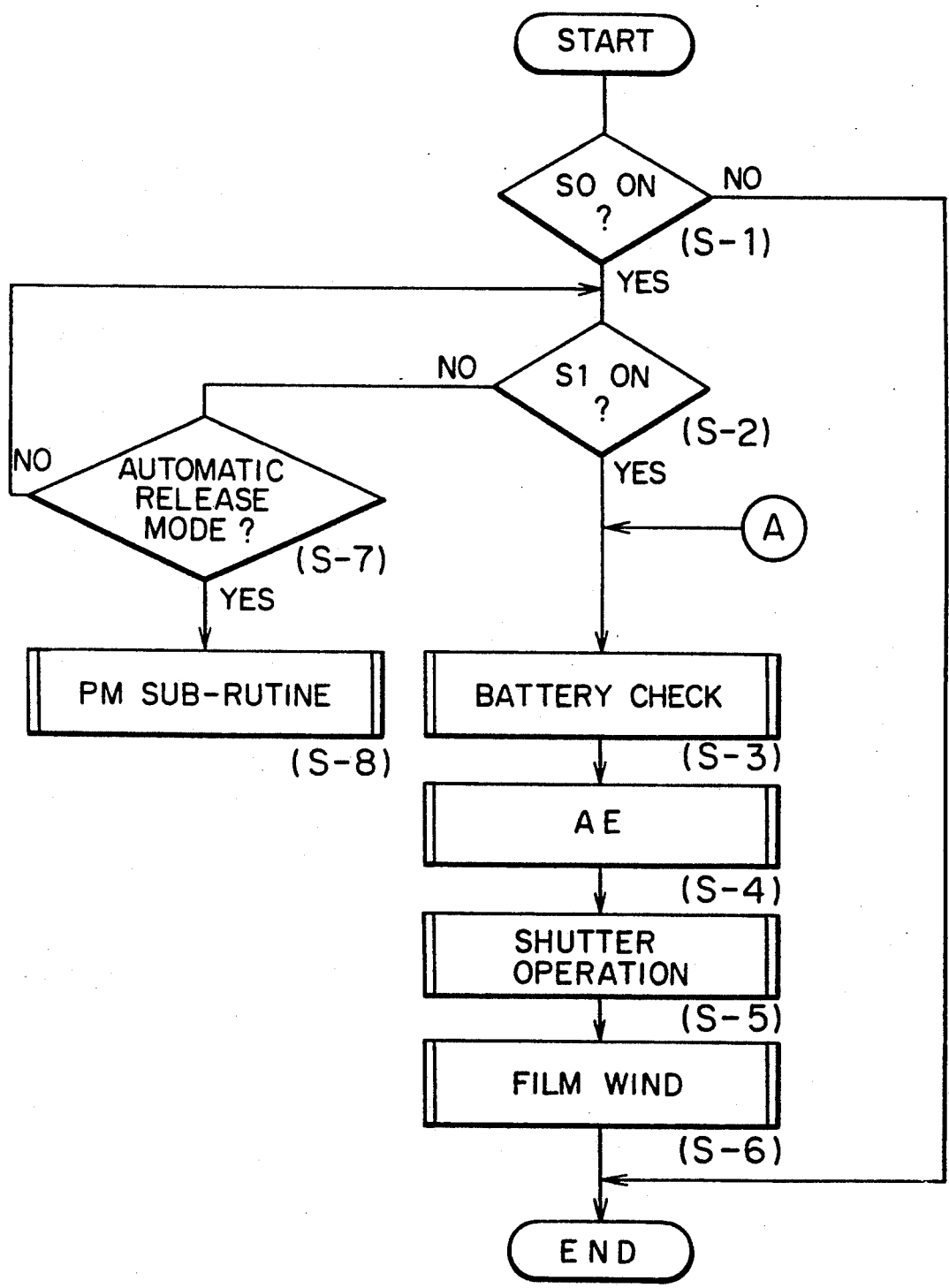
FIG. 8 is a flow chart showing a main routine of photographing sequence in an automatic release camera of the invention.

FIG. 8 shows the main routine of a photographing sequence, and in the first place, switch SO is judged (S-1) whether it is ON (lens barrier 9 is open) or not, and then, when it is ON, S1 is judged (S-2) whether it is ON (shutter-release button 4 is pushed) or not, and when it is ON, battery-check (S-3), photometry (S-4) and shutter-driving (S-5) are performed for photographing, and then the film is taken up (S-6).

In the flow chart in FIG. 8, the actions such as automatic loading (film automatic loading), automatic charging for flash light, automatic reading of DX codes and date-photographing are omitted because they are not related to the invention.

In the step (S-2), when S1 is not ON, it is judged (S-7) whether it is in the automatic release mode or not from the state of switch PMS, and if it is in the automatic release mode, the PM sub-routine is executed (S-8).

Figure 9:
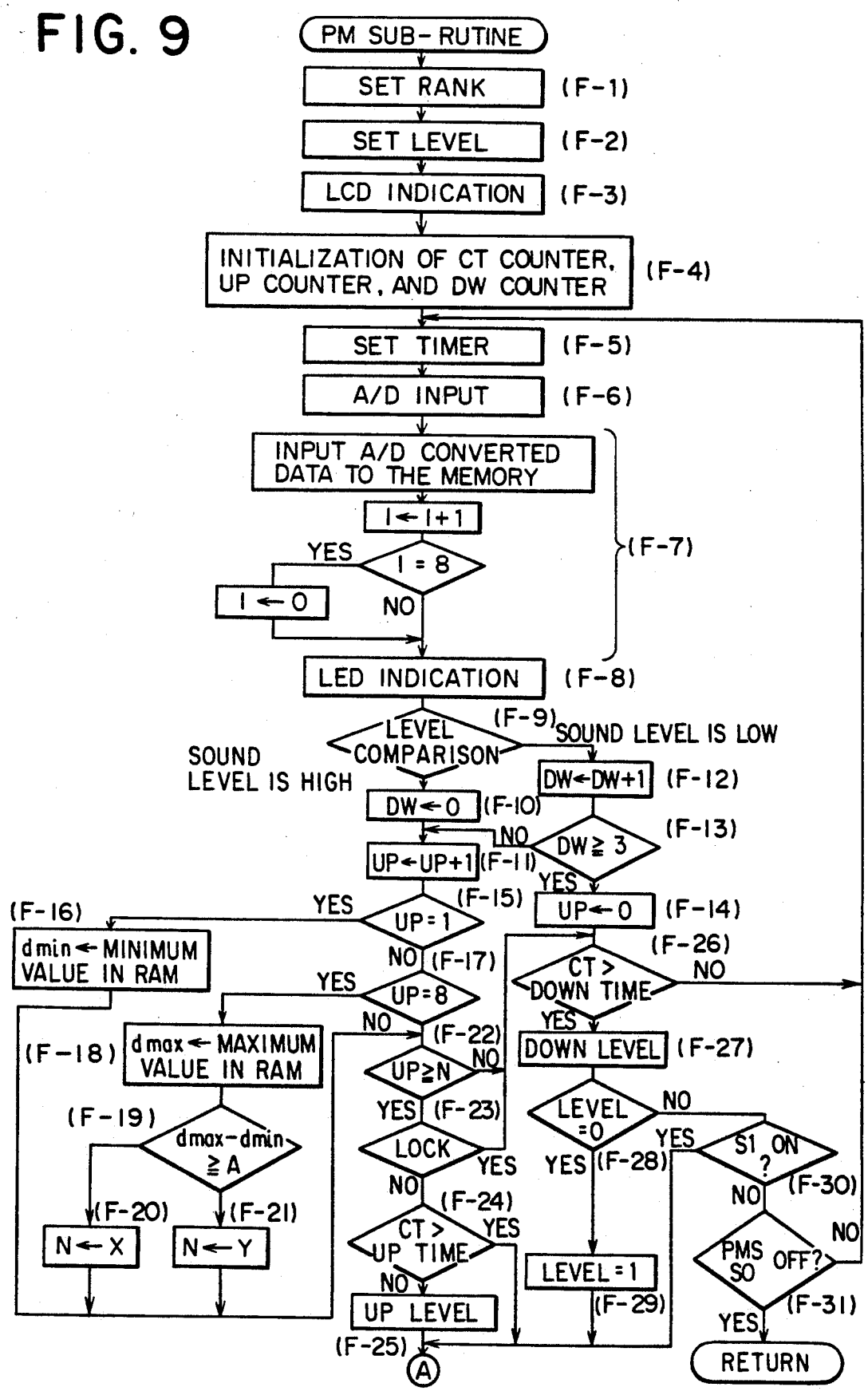
FIG. 9 is a flow chart illustrating an action of CPU that conducts the automatic release control.

FIG. 9 is a flow chart for the PM sub-routine, and in the first step, the minimum continuing period that is a reference for shutter-releasing is taken into a digital memory in CPU 23 from a table, according to the rank ('easy releasing' is rank 1, 'normal releasing' is rank 2 and 'hard releasing' is rank 3) corresponding to shutter-releasing ranks set by a user by the use of rank-setting button 8. In the memory in CPU 23, a table of the minimum continuing periods shown below are stored, and the minimum continuing periods X and Y are moved to a digital memory in CPU 23, corresponding to the ranks representing the shutter-releasing ranks.

| shutter-releasing rank | minimum continuing period for crashing sound X | minimum continuing period for laughing voice Y |
|---|---|---|
| Rank 1 | 40 (400 msec) | 20 (200 msec) |
| Rank 2 | 50 (500 msec) | 30 (300 msec) |
| Rank 3 | 70 (700 msec) | 50 (500 msec) |

For example, when rank 2 is set, X=50 (500 msec) and Y=30 (300 msec) are moved to the memory in CPU 23.

In the next step, the reference voice pressure level (e.g. medium level) determined in advance is automatically set (F-2). These ranks and reference voice pressure levels are displayed on liquid crystal display panel 10 on a camera through LCDs (F-3).

After that, each of CT, UP and DW counters are initialized (F-4). CT counter is a counter that counts the time elapsed after shutter-releasing, UP counter is a counter that is incremented when the voice pressure level detected is higher than the reference voice pressure, and DW counter is a counter that is incremented when the voice pressure level detected is lower than the reference voice pressure level.

In the next step, a timer of 10 msec is set (F-5), and there is started (F-6) the reading of the data which has been A/D-converted from the voice pressure level of a voice inputted from microphone 34. On CPU 23, A/D-converted data of the 8 latest voice pressure levels read with an interval of 10 msec are stored (F-7) in the memory inside thereof, and the instantaneous voice pressure level is displayed on LED 6 (F-8).

Next, the voice pressure level of a voice inputted is compared (F-9) with a reference voice pressure level, and when the former is greater than the latter, DW counter is set to '0' (F-10) and UP counter is incremented (F-11). When the former is smaller than the latter, on the contrary, DW counter is incremented (F-12), and further, it is judged if the number counted by DW counter is 3 or more (F-13). When it is not less than 3, UP counter is cleared (F-14). When the number counted by DW counter is less than 3, UP counter is incremented (F-11). Since the timer is set to 10 msec, the counted number '3' means 30 msec (10 msec×3). Namely, when the voice pressure level of a voice inputted is lower than the chatter mask reference voice pressure level for the period of time that is less than 30 msec, it is judged to be more than the reference voice pressure level continuously. Thus, the chatter mask is applied.

Next, when UP counter is 1 (F-15), namely when the voice pressure level of an inputted voice exceeds the reference voice pressure level, the data of the smallest value among the 8 voice pressure level data stored most recent in a digital memory in CPU is read as $d_{min}$ (F-16). After that, when UP counter becomes 8 (F-17), namely, when the voice pressure level of the inputted voice continues to be higher than a reference voice pressure for the predetermined time (80 msec in this example), the maximum value among the 8 latest voice pressure level data stored in a digital memory in CPU 23 is read out as $d_{max}$ (F-18).

After $d_{max}$ and $d_{min}$ are read out, there is made judgment of whether the condition of $d_{max}-d_{min}\geq A$ is satisfied or not (F-19). Here, A is a constant determined depending on the sensitivity of microphone 34 and on the characteristics of voice process circuit 33, and it is, for example, 1 V. When the condition of $d_{max}-d_{min}\geq A$ proves to be satisfactory as a result of the judgment, the rise rate of the voice pressure level is judged to be sharp representing that the inputted voice is a crashing sound, and X (e.g. 50 that represents 500 msec in case of rank 2) is used for the minimum continuing period constant N that is a reference for the shutter-releasing action (F-20). When the condition is $d_{max}-d_{min}<A$, the rise rate of the voice pressure level is judged to be gentle representing that the inputted voice is a laughing voice, and Y (e.g. 30 that represents 300 msec in case of rank 2) is used for the minimum continuing period constant N that is a reference for the shutter-releasing action (F-21). As is clear from the previous table, when a user sets to rank 1 (easy releasing) through rank-setting button 8, 40 representing 400 msec is used as X and 20 representing 200 msec is used as Y. When rank 3 (hard releasing) is set, 70 representing 700 msec is used as X and 50 representing 500 msec is used as Y.

Now, returning to step (F-15), when UP counter is 1 through 7 and is 9 or more, the flow advances to step (F-22) where judgment is made whether the UP counter exceeds X or Y which UP counter inputted at step (F-20) or step (F-21) as the minimum continuing period constant N or not, namely, whether the voice pressure level of an inputted voice continues to be higher than a reference voice pressure level for the period equal to or longer than X (in case of rank 2, 50, namely 50×10 msec=500 msec) or not.

During the period in which the voice pressure level is equal to or more than a reference voice pressure level and such condition has not covered the minimum continuing period, CT counter value and down time are compared (F-25). In the step (F-22), on the other hand, when the voice pressure level is judged to be higher than a reference voice pressure level for a period of the minimum continuing time or more, judgment of whether it is locked state or not is made (F-23). A reference voice pressure level is arranged so that it may vary over 5 steps from '1' to '5', and in step (F-23), there is established a locking condition that prohibits the next shutter-releasing for one minute period after the shutter-releasing when the reference voice pressure level is at the highest '5', thus preventing that the shutter is released too easily. When such condition is not satisfied, CT counter value and up time are compared (F-24), while, when the condition is satisfied, the flow advances to step (F-26) where CT counter value and down time are compared.

The up time and down time represent a time period established in advance for the purpose of adjusting a shutter so that it will be released properly avoiding the releasing which is too easy or too hard, the time period elapsed after shutter-releasing is shorter than the up time (e,g, 30 sec), the shutter is judged to be too easy for releasing, thus the reference voice pressure level is raised by one step (F-25), thereby changing the shutter to be in a 'hard releasing' state. When the time period elapsed after shutter-releasing is longer than the up time, on the contrary, the shutter is judged to be too hard for releasing and the reference voice pressure level is lowered by one step (F-27). When the elapsed time is within the down time, this does not mean that the shutter is too hard for releasing, and the flow returns to step (F-5) for new reading.

The down time varies depending on the reference voice pressure level, and is established as shown in the table below.

| Reference voice pressure level | Down time |
| --- | --- |
| 1 | 8 min. |
| 2 | 5 min. |
| 3 | 3 min. |
| 4 | 2 min. |
| 5 | 30 sec. |

In the above table, the lower the reference voice pressure level is, the longer is the down time. The reason for that is to prevent, by setting the down time long, the reference voice pressure level from going down excessively, because the probability of shutter-releasing is increased when the reference voice pressure level is low. With regard to the up time, it may also be set longer when the reference voice pressure level is lower, in the same concept as that of the down time, though it is fixed in the present example.

When a shutter is not released despite the lapsed time of 8 minutes at the reference voice pressure level of '1', the level is lowered down to '0' at step (F-27). At step (F-28), the level is checked whether it is '0' or not, and when the level becomes '0', the flow advances to the shutter sequence after setting the level to '1' again (F-29), thereby driving the shutter-release button. Namely, in such a case, a shutter is released regardless of the voice pressure level of an inputted voice. Thereby, the state wherein a shutter remains unreleased can be avoided. Further, such arrangement enables the interval photographing possible. When the level is not '0' at step (F-28), the flow goes to step (F-30).

At this time, when switch S1 is ON, the flow goes to the shutter sequence for driving the shutter, and when it is not ON, switch PMS and switch SO are checked (F-31). When neither PMS swich nor SO switch is OFF, the flow returns to step (F-5), while when either one of them is OFF, the flow returns to a main routine in FIG. 8.

In the aforesaid example, the chatter mask is applied and the reference voice pressure level is caused to change stepwise automatically, but this is not the characteristic of the invention. Therefore, the invention can naturally be applied to an automatic releasing camera of a simple type wherein no chatter mask is applied and a reference voice pressure level is fixed.

Further, when the rise rate of the voice pressure level of an inputted voice exceeds the prescribed value in the aforesaid example, the minimum continuing period that is a reference for shutter-releasing is established again to a certain value which is greater than that in the state before exceeding, but the minimum continuing period may be established so that it changes to a larger value as the rise rate changes to a greater value.

In an automatic release camera of the invention wherein the voice pressure level of an inputted voice is detected and a shutter is released when the detected voice pressure level continues to be higher than the reference value for the prescribed time period, the aforesaid prescribed time period can be changed, as stated above, depending on the rise rate of the voice pressure level of an inputted voice. Therefore, it is possible to cause the shutter-releasing action to be made when a banquet or a party arrives its climax or its pleasure reaches the highlight, preventing the shutter-releasing action from being made by a shout of 'Hey!' or 'Get me a bottle of beer!'

What is claimed is:

1. A camera for taking a photograph by automatically releasing a shutter, comprising:
   means for detecting a sound pressure level of an inputted sound;
   means for measuring a rate of increase of the detected sound pressure level;
   means for comparing the measured rate of increase of the detected sound pressure level with a predetermined value and selecting a first period of time from a preselected range in accordance with the comparison means for measuring a second period of time when the detected sound pressure level exceeds a predetermined sound pressure level;

means for commencing the first period of time simultaneously with the second period of time; and means for automatically releasing the shutter when the second period of time is longer than the first period of time.

2. The camera of claim 1, wherein the comparison means comprises a CPU.

3. The camera of claim 1, also including memory means for storing the first period of time in a digital data form, the comparing means comparing the second period of time with the first period of time stored in the memory means by digital processing.

4. The camera of claim 3, wherein the memory means includes a plurality of time data stored therein, the first period of time being selected from the time data.

5. The camera of claim 2, wherein the rate of increase of the detected sound pressure level is determined by the difference between a maximum sound pressure and a minimum sound pressure within a third period of time, the third period of time being defined by a predetermined time before and after a reference time when the detected sound pressure level exceeds a reference sound pressure level.

6. The camera of claim 5, wherein the selecting means includes means for shortening the first period of time when the difference between the maximum sound pressure and the minimum sound pressure is less than a second predetermined value, and lengthening the first period of time when the difference between the maximum sound pressure and the minimum sound pressure is not less than the second predetermined value.

* * * * *

UNITED STATES PATENT AND TRADEMARK OFFICE
CERTIFICATE OF CORRECTION

PATENT NO. : 5,162,832
DATED : November 10, 1992
INVENTOR(S) : Tsuyoshii Kakita et al.

It is certified that error appears in the above-identified patent and that said Letters Patent is hereby corrected as shown below:

On the title page: Item [75] Inventors:

change "Hishino" to --Hoshino--;

change "Topkyo" to --Tokyo--.

after "Kakita" insert --, of Houya--;
and change "both of Topkyo, Japan" to --Tokyo, both of Japan--.

Claim 1, Column 8, Line 68 after "comparison" insert --;--.

Signed and Sealed this

Twenty-eighth Day of December, 1993

Attest:

BRUCE LEHMAN

*Attesting Officer*      *Commissioner of Patents and Trademarks*